Patented Jan. 12, 1937

2,067,297

UNITED STATES PATENT OFFICE 2,067,297

FINISHING MATERIAL AND PROCESS OF MAKING THE SAME

Lawrence R. van Allen, Chicago, Ill.

No Drawing. Application February 7, 1934, Serial No. 710,182

7 Claims. (Cl. 51—279)

This invention relates in general to improvements in abrasive or polishing material, and a method of producing the same.

A principal object of the invention is the provision of a commercially usable material from the waste and seemingly valueless product remaining from the manufacture of refined shellac and other vegetable gums.

Another object of the invention is the provision of a material which may be worked into different forms in which it may be used for abrasive, cleaning, wood-filling, polishing, and other purposes, and which may be economically obtained as one of the by-products resulting from the manufacture of refined or wax free shellac.

Numerous other objects and advantages of the invention will be apparent as it is better understood from the following description which discloses a preferred embodiment thereof.

The crude material from which shellac and varnish are produced, is an animal or vegetable exudation gathered in tropical or semi-tropical countries. This crude material is known in the trade by various names, such as stick-lac, seed lac, crude shellac, Buttonlac, Tongue lac and Garnet lac. After having been reduced to solid form this material is crushed, washed, cleansed, and heat treated in order to obtain a form of shellac which still contains considerable coloring matter and other foreign material. These foreign materials may be defined as waxlike materials, and in order to obtain shellac which may be used in the industry and from which certain types of varnish may be produced, it is necessary to remove the coloring matter, as well as other foreign ingredients or waxlike substances.

For the purpose of extracting the coloring matter from the pre-heated shellac, it is bleached. This bleaching process is accomplished by washing the material with hot water to remove part of the dye or coloring material, then saponifying with alkali and hot water, and then it is brought into contact with chlorine or other bleaching agents in gas or liquid form.

After the coloring matter has been extracted and the material has been bleached, it is then neutralized by the addition of an acid, such as sulphuric acid, and from the resultant product gum shellac is precipitated in that form in which it then can be treated with alcohol for conversion into varnish or filtered by mechanical or other means.

While the material is still in alkaline condition and prior to neutralization by the addition of the acid, it is advisable and customary, for some purposes, to remove the wax content. This refining treatment may be accomplished by filtering the material or by letting it stand and permitting the wax to be slowly deposited from the alkaline solution. The wax content of the material is thus freed and the filtered mass removed from the gum has heretofore been regarded as refuse of little or no value.

The present invention primarily relates to the treating of this refuse or waste material which heretofore has not been used and which contains a wax. This product after being subjected to my process, is of great value as an abrasive or for polishing, filling, and like purposes.

As the material comes from the filter, it contains wax and sometimes kieselguhr, and constitutes a powder which may be used in tumbling barrels in which small articles of wood or metal are given a desired finish.

The material contains some moisture and this may be removed by drying from the finished product, or by filtering the moisture out while the material is still in powdered form. After removing the remaining traces of moisture by heating, there is produced a powder which can be further reduced in size by grinding. This material, which has heretofore been considered waste product, may be used in tumbling barrels for polishing purposes.

This powder in its loose form, may be forced into violent impact with the articles to be cleaned, and may also be substituted for sand in a sand blasting apparatus, the action of this powder, however, because of its wax content, being milder than the action of the sharp-edged and fine grained sand which had been used in sand blasting apparatus, and having a better polishing effect.

This material may be ground to various degrees of fineness and may be applied to paper in the same manner in which carborundum, sand, glass, emery or other grinding materials have been applied to paper, cloth or other sheet material to provide a substitute for sandpaper, polishing felt and the like; and this paper may be used in the same manner in which sandpaper is used for the treatment of furniture and in various branches of the furniture industry.

The material may also be applied to buffing wheels, sanders, polishers and the like, and in this form or in powdered form, it may be utilized for polishing leather in the manufacture of shoes, harnesses and other leather goods; or it may be used as a filler and glazing material to impart a glazing finish to paper, cardboard and the like.

Another use to which this material in powdered form may be put, is to apply it to dance floors and other floors as a waxing agent for renewing the lustre and smoothness of the floor; and, it may also be used for preserving the appearance of linoleum or other floor coverings. It may be ground to a coarse consistency and in this form may be applied to the floors of bowling alleys, gymnasiums, and so forth, for polishing and reconditioning them.

The material, however, may be very readily converted into liquid or paste form by removing the kieselguhr. This is accomplished by adding to the composition ethyl dichloride, dichlorethylene or other suitable commercial solvent, leaving a residuum of wax in liquid or paste form. In this liquid form it may be used as a leather dressing or polish, or in polishes of this nature. In this liquid form also, it has great value as an automobile polish or as an ingredient in other polishes for lacquered, varnished or painted surfaces. It may be used in liquid form on linoleum and other floor coverings to renew the appearance and lustre. In this liquid form it makes a very superior furniture polish, and in the form containing wax is adapted to be used as a cleaner and polish for all surfaces requiring a liquid wax. When so used, it will be found that the surfaces so cleaned and polished are free from any greasy or sticky feeling which frequently results when other polishes are used.

In order to convert the powder produced as a waste material in the manufacture of shellac to paste form, the water is not completely removed therefrom, and in this form it is mixed with suitable emulsifying agents or solvents and with oleic, stearic or other suitable fatty acids, thus producing a paste or soap which may be substituted for the more expensive paste polishing material used for highly varnished, painted or enamelled surfaces.

Where it is desired to convert this waste product into briquette form, the mixture of the wax remaining as residue from the shellac production is combined with oleic, stearic or other suitable fatty acids or resins, and in this form it can be molded to briquette shape where it is highly useful for buffing compounds, for platers and polishers of metals, glass and like substances, ceramic material and the like.

When this material is converted in paste or liquid form, it may be used as a wood filler, adapting itself to final finishing as well as filling.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being a preferred embodiment thereof.

I claim:

1. A process of producing smoothing material, including the steps of heat treating crude shellac or other vegetable gums, removing the coloring material from the same, and filtering the waxlike material from the resulting solution, drying the waxlike residue, reducing it to powder, and freeing it from kieselguhr.

2. A process of producing a smoothing material, including the steps of bleaching crude shellac or other vegetable gums in alkaline solution, extracting the waxlike contents from the solution, drying said waxlike contents, grinding it, freeing it from kieselguhr, and converting it into non-solid condition.

3. The method of making a paste polishing material comprising partially drying the waxlike residue remaining from the bleaching and dewaxing of shellac and other vegetable gums, and mixing therewith suitable emulsifying agents and a fatty acid.

4. The method of making a buffing compound comprising partially drying the waxlike residue remaining from the bleaching and de-waxing of shellac and other vegetable gums, mixing therewith a fatty acid, and moulding the resulting substance into briquette form.

5. A paste polishing material comprising the waxlike residue remaining from the bleaching and de-waxing of crude shellac mixed with suitable emulsifying agents and a fatty acid.

6. A buffing compound comprising the waxlike residue remaining from the bleaching and de-waxing of crude shellac mixed with a fatty acid and molded into briquette form.

7. A process of producing smoothing material, including the steps of heat treating crude shellac, removing the coloring material from the same, and filtering the waxlike material from the resulting solution, drying the waxlike residue, reducing it to powder by grinding, and freeing it from kieselguhr by adding thereto a suitable solvent.

LAWRENCE R. van ALLEN.